United States Patent [19]

Beran

[11] Patent Number: 5,161,232
[45] Date of Patent: Nov. 3, 1992

[54] MODULAR SELF-PROGRAMMER

[76] Inventor: James T. Beran, 2101 California St., Apt. 104, Mountain View, Calif. 94040

[21] Appl. No.: 850,214

[22] Filed: Mar. 12, 1992

Related U.S. Application Data

[63] Continuation of Ser. No. 776,819, Sep. 17, 1985, abandoned.

[51] Int. Cl.$^5$ .............................................. G06F 15/00
[52] U.S. Cl. ................................. 395/800; 364/916.2; 364/972.2; 364/DIG. 2; 395/500; 395/50
[58] Field of Search ................... 395/11, 50, 92, 800, 395/500

[56] References Cited

U.S. PATENT DOCUMENTS

| | | | |
|---|---|---|---|
| 3,601,811 | 8/1971 | Yoshino | 340/172.5 |
| 3,716,840 | 2/1973 | Masten et al. | 340/172.5 |
| 4,258,425 | 3/1981 | Ramsey et al. | 364/513 |
| 4,366,551 | 12/1982 | Holtz | 364/900 |
| 4,384,273 | 5/1983 | Ackland et al. | 364/513 |
| 4,479,241 | 10/1984 | Buckley | 382/15 |
| 4,484,303 | 11/1984 | Provanzano et al. | 364/900 |
| 4,516,202 | 5/1985 | Kadowaki | 364/900 |
| 4,523,299 | 6/1985 | Donohue et al. | 364/900 |
| 4,578,764 | 3/1986 | Hutchins et al. | 364/513 |
| 4,599,693 | 7/1986 | Denenberg | 364/513 |
| 4,633,385 | 12/1986 | Murata et al. | 364/513 |
| 4,638,421 | 1/1987 | Kimizuka et al. | 364/183 |
| 4,697,242 | 9/1987 | Holland et al. | 364/513 |
| 4,773,028 | 9/1988 | Tallman | 364/550 |
| 4,783,741 | 11/1988 | Mitterauer | 364/413.01 |

FOREIGN PATENT DOCUMENTS 0159463 10/1985 European Pat. Off.
85-01364 3/1985

OTHER PUBLICATIONS

Narendra, K. S. and Thathachar, M. A. L., "Learning Automata-A Survey," IEEE Transactions on Systems, Man, and Cybernetics, vol. SMC-4, No. 4, Jul. 1974, pp. 323-334.
Laird, J. E., Rosenbloom, P. S., Newell, A., "Towards Chunking as a General Learning Mechanism" in *Two Soar Studies*, (Pittsburgh: Carnegie-Mellon) 1985.
Rosenbloom, P. S., Laird, J. E., Newell, A., Golding, A., Unruh, A. "Current Research on Learning in Soar" May 1985.
Marrs, T. *The Personal Robot Book*, (Blue Ridge Summit: TAB Books) 1985, pp. 44-51.
Holusha, J., "Robots That See and Feel", *The New York Times*, Jun. 6, 1985, p. D2.
Interrante, L. D., and Biegel, J. E. "The Marriage of Artificial Intelligence and Robotics in the Manufacturing Environment", Robots 9 Proc., Jun. 1985.
Heiserman, D. L. *Robot Intelligence . . . With Experiments*, (Blue Ridge Summit: TAB Books) 1981, pp. 13-23, 31-50, 61-66, 91-105, 140-159, and 219-290.
Heiserman, D. L. *How to Build Your Own Self-Programming Robot*, (Blue Ridge Summit: TAB Books) 1979, pp. 9-19 and 175-218.
Yarmolinsky, M., "On Impossibility in Biology," in Davis, P. J. and Park, D., Eds., *No Way*, W. H. Freeman and Co., New York, 1987, pp. 29-43.

*Primary Examiner*—Thomas C. Lee
*Assistant Examiner*—Ayni Mohamed

[57] ABSTRACT

A self-programming technique includes receiving a sequence of input signals and comparing each input signal with an expectation signal. A sequence of output signals is generated from the input signals, and at least part of the output signal sequence is stored when the expectation signal compares favorably with the input signal. Modular units performing this technique may be connected as a master with one or more servants. The master provides the expectation signals for the servants as its output and receives their signals indicating their comparison outcomes as its input. Within each programmer, a random number may be generated as an output when the input signal received is not expected and has not previously been stored as an input preceding an output signal. The random number output provides trial and error capabilities.

28 Claims, 3 Drawing Sheets

5,161,232

MODULAR SELF-PROGRAMMER

This is a continuation of application Ser. No. 06/776,819, filed Sep. 17, 1985 now abandoned.

BACKGROUND OF THE INVENTION

The present invention relates to a machine which programs its own operation. More specifically, the invention relates to a self-programmer which can be joined as a modular unit to other self-programmers, to provide a more complex self-programmer.

As programmable machines, typically built around microprocessors, have become more common, the task of programming them has become an increasingly significant factor in their production. Some recent studies recognize that it is possible, in principle, to provide a machine which is self-programming. Some proposals approach the problem from the point of view of a specific programming task, such as the movement of a robot.

It would be advantageous to have a more generally useful self-programmer, capable of approaching a wide variety of programming tasks, with minimal modification. It would further be advantageous to have a modular self-programmer capable of being combined with other identical modules form a more complex self-programmer.

SUMMARY OF THE INVENTION

The present invention provides a generalized self-programmer which may be provided in modular form, with modules capable of being combined to form a more complex self-programmer.

A self-programmer, according to the present invention, includes input circuitry which receives input signals. Expectation circuitry provides an expectation signal indicating at least one of the possible input signals, and the expectation signal is compared with the input signal by comparing circuitry. If the input signal is indicated by the expectation signal, the comparing circuitry provides a comparison signal. Generating circuitry receives the input signals and provides output signals in response, and the comparison signal causes at least part of the output signals to be stored in program storing circuitry.

A method of self-programming, according to the invention, similarly includes providing an expectation signal, receiving a sequence of input signals, and comparing the input signals with the expectation signal. If the expectation signal indicates a received input signal, a comparison signal is provided. Meanwhile, a sequence of output signals is generated in response to the input signals, and the comparison signal causes data corresponding to at least part of the output signal sequence to be stored.

Each output signal may be stored with a preceding input signal and an expected input signal as a step in a series. If the expected input signal indicates the input signal received after the output signal is provided, then the next step in the series is applied. If not, the expected input signal may be modified, and a further test may be performed to determine whether the input signal received is one of the preceding input signals, which may be used to begin a new sequence. When appropriate, a random output signal may be provided to provide trial and error self-programming.

In a modular self-programmer, according to the invention, a master programmer is connected to one or more servant programmers. The outputs from the master serve as the expectation signals for the servants. The comparison signals from the servants, on the other hand, serve as input signals for the master. The servants are thus controlled by the master.

These and other objects, features and advantages of the invention will become more fully apparent from the following description together with the drawings and the appended claims.

DETAILED DESCRIPTION OF THE PREFERRED EMBODIMENTS

1. Basic Embodiment

Figure 1:
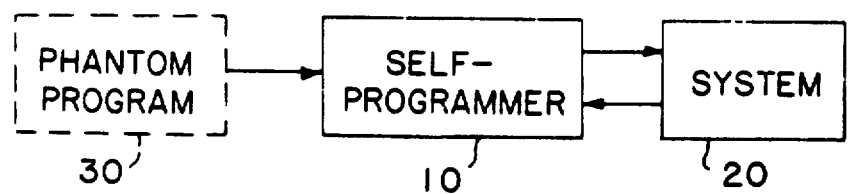
FIG. 1 is a block diagram showing the relation between a self-programmer and its environment.
Figure 2:
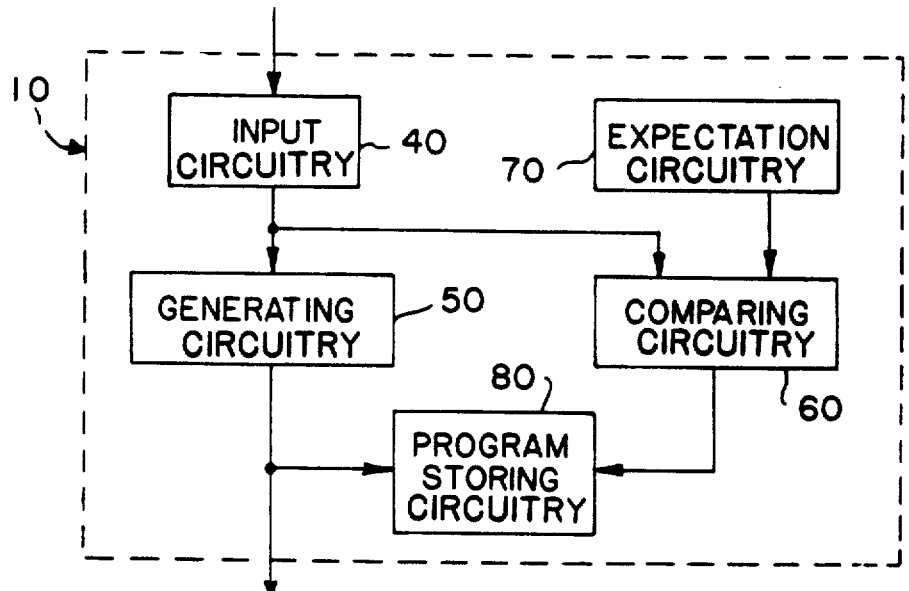
FIG. 2 is a block diagram showing the major functional components of a self-programmer, according to the present invention.

The basic embodiment of a self-programmer according to the present invention can be understood from FIGS. 1 and 2. FIG. 1 shows a self-programmer in its environment, while FIG. 2 shows the inner functional components of a self-programmer according to the invention.

Self-programmer 10 interacts with system 20 by providing outputs and receiving inputs. Although system 20 is shown as a discrete component, it need not be a single component, but could be any environment with which self-programmer 10 could interact. In order for self-programmer 10 to operate effectively, however, there must be a relationship between the outputs provided to system 10 and the inputs received from it. This relationship is shown in phantom in FIG. 1 as phantom program 30, and may be thought of as a program which, if executed by self-programmer 10, would result in a desired input or series of inputs from system 20.

The present invention is based in part on the discovery that a combination of components, as shown in FIG. 2, will provide a self-programmer 10 as described above. Input circuitry 40 receives a sequence of input signals from system 20 and provides them to generating circuitry 50 and comparing circuitry 60. Expectation circuitry 70 provides an expectation signal, indicating at least one of the possible input signals. Comparing circuitry 60 compares the expectation signal with the input signals, and provides a comparison signal when the input signal is one of those indicated by the expectation signal. Meanwhile, the generating circuitry 50 is generating a sequence of output signals in response to the input signals. When the comparison signal is provided, at least part of this sequence of output signals is stored by program storage circuitry 80.

As a result of the combination of FIG. 2, a sequence of outputs will be stored, which succeeded in producing an input signal indicated by the expectation signal from expectation circuitry 70. This result provides one basic type of self-programming.

Figure 3:
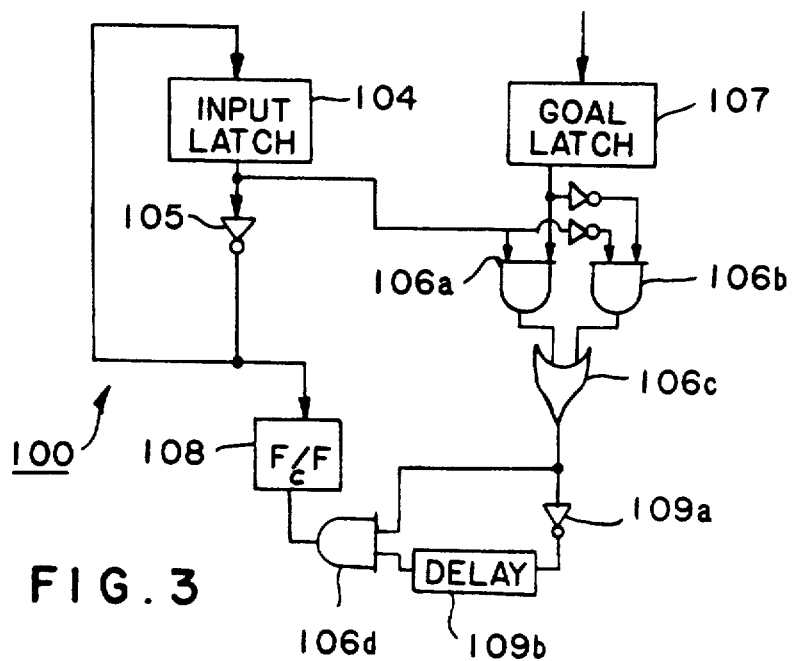
FIG. 3 is a schematic digital circuit which forms one embodiment of the self-programmer of FIG. 2.

FIG. 3 illustrates a simple digital circuit 100, including the basic functional components of FIG. 2. Input latch 104 receives the input signals which, in this simple case, are the outputs. Inverter 105, which may include a delay, inverts the input signal to provide the output signal. AND gates 106a and 106b also receive the input signal and, when it is the same as the value stored in goal latch 107, provide a comparison signal through OR gates 106c and AND gate 106d to flip-flop 108, which serves to store the output signal which produced the desired input signal. As long as no comparison signal is provided, the AND gate 106d will be off, holding flip-flop 108 stable, but when the comparison signal occurs, AND gate 106d will temporarily be on, clocking flip-flop 108 to store the output from inverter 105. Inverter 109a and delay element 109b will then turn off AND gate 106d, to complete the storing process.

In the simple single-bit example of FIG. 3 the system is a direct connection of output to input. The present invention is applicable, however, to far more complicated systems and can be used to provide self-programmers which interact with such systems to produce desired results. Furthermore, although the simple self-programmer 100 of FIG. 3 is digital, the present invention would be equally applicable to analog embodiments, except that the output of comparing means 60, as in FIG. 2, must be a digital value, indicating that the input signal received fits within the goal defined by the expectation signal. The preferred embodiments described below, however, are digital except as otherwise noted.

II. A Detailed Embodiment

Figure 4:
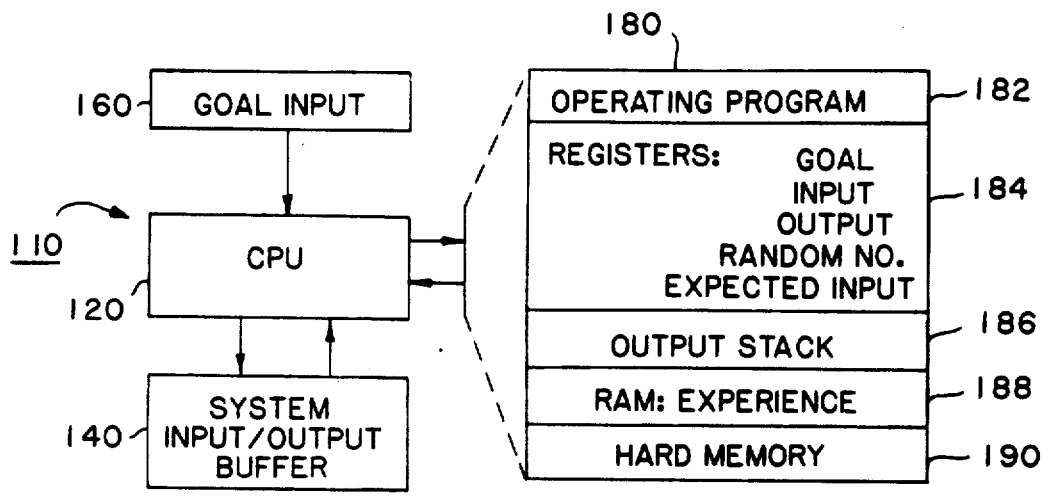
FIG. 4 is a schematic digital circuit forming another embodiment of the self-programmer of FIG. 2.
Figure 5:
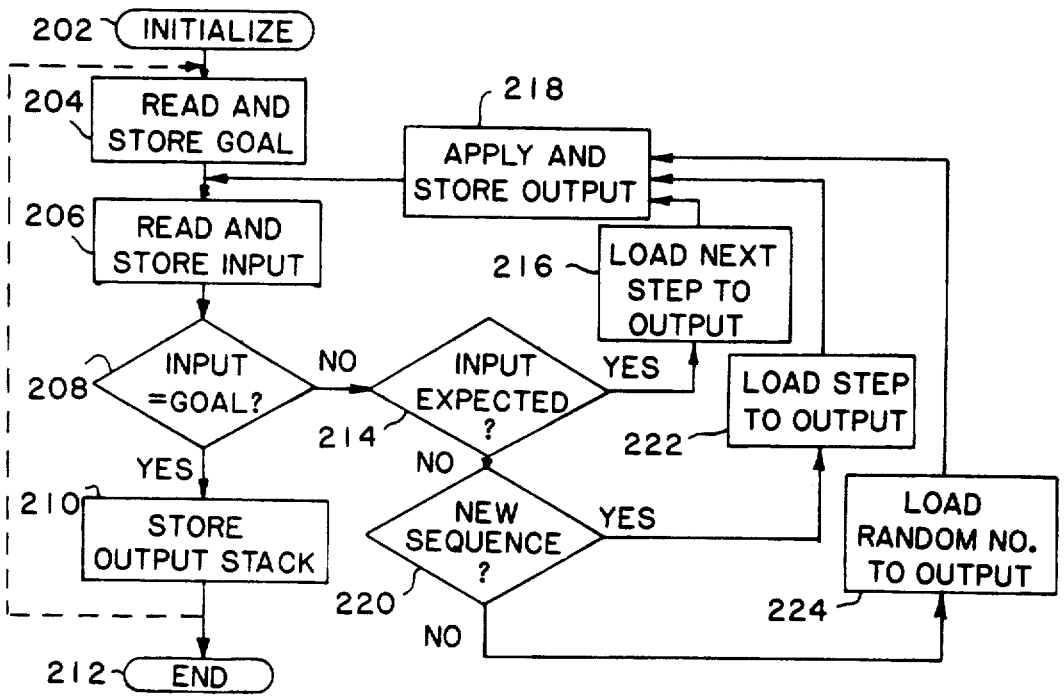
FIG. 5 is a self-programming flow chart for the circuit of FIG. 4.

FIG. 4 shows a more detailed embodiment of a self-programmer 110 centered around a microprocessor or other appropriate central processing unit (CPU) 120. FIG. 5 is a flow chart of a program which CPU 120 could execute to provide a self-programmer according to the present invention.

As shown in FIG. 4, CPU 120 receives inputs from and provides outputs to a system through system input-/output buffer 140, which may be a conventional input-/output device serving CPU 120. Input/output buffer 140 may be connected to any appropriate input and output devices, whether mechanical, electrical, or other, provided that the relationship between the outputs and the inputs is within the ability of self-programmer 110 to discover.

CPU 120 is also connected to goal input 160, from which it receives inputs, indicating the inputs from buffer 140 which are expected. Goal input 160 may be a passive input or may be an inter-active input.

CPU 120 is also connected to memory 180, which is shown as an addressable memory space. If CPU 120 is a microprocessor, operating program 182 will typically be stored in a PROM, and will follow a flow chart like that in FIG. 5, discussed below. Registers 184 are provided for temporary storage of values such as the goal, the input, the output, or a random number. Output stack 186 is a memory which stores the outputs provided to the system in sequence, together with other appropriate data, such as the input expected in response to each output. RAM 188 stores the data used by CPU 120 in generating outputs, and hard memory 190 may also be provided, such as a disk drive, for storing a large quantity of such data. In general, such data will be referred to herein as experience and the experience in RAM may be thought of as the relevant experience, while the contents of output stack 186 may be thought of as current experience.

FIG. 5 shows how CPU 120 may operate in self-programmer 110. The flow chart of FIG. 5 is merely illustrative of a sequence which provides the functions shown in FIG. 2. Many other sequences could be developed, which would result in self-programming of the type shown in FIG. 2. The sequence of FIG. 5 is relatively straightforward, however, yet versatile.

In step 202, CPU 120 initializes, taking whatever steps are necessary to begin execution of the operating program 182. This may involve setting an instruction register which is used to address operating program 182. Also registers 184 may be initially set to appropriate values, and output stack 186 may similarly be cleared.

When initializing is complete, CPU 120 proceeds to read the input from goal input in step 204, storing the goal in the goal register. Rather than being a single value, the goal could be a sequence of goals, so that a goal stack or other sequential memory could be provided for storage of the goal sequence. Each goal, however, would require a similar sequence of subsequent steps until met, after which the next goal would be sought.

In step 206, the inputs from the system are read from buffer 140, and stored in the input buffer. This step corresponds to input circuitry 40 in FIG. 1, and could include any appropriate processing of input data to make it amenable to storage.

If self-programmer 110 includes hard memory 190, experience from hard memory 190 may be loaded into RAM 188 during one of steps 202, 204 or 206. If experience is limited, it may all be loaded into RAM 188 during initialization. If experience is greater, but manageable for a specific goal, it may be loaded after the goal is read in step 204. If even greater, it may be loaded for a specific input after the input is read in step 206.

When the goal and input have both been read, they are compared in step 208. This step corresponds to the comparing circuitry 60 of FIG. 2. The comparison may be a bit by bit comparison or any other comparison which produces an affirmative outcome only when the input is one of the inputs indicated by the goal. Numerous comparison techniques are possible, of course, and the particular comparison technique used could be an algorithm suited to the specific input data. If the input is two-dimensional, techniques such as edge detection and the like may be useful.

If the input is one of those indicated by the goal, CPU 120 will proceed to store the sequence in the output stack 186 in hard memory 190, in step 210, adding it to the stored body of experience. Step 210 corresponds to program storing circuitry 80 in FIG. 2. The manner in which this experience is stored will depend somewhat on how it is to be retrieved for loading into RAM 188. For example, each data entry may include three fields, one for the output itself, a second for the input which preceded it, and a third for the resulting input. At the time of storage, a directory may be generated indicating the start of a sequence of data entries which attained a specified goal. Another directory may be generated for accessing each separate data entry according to the second field, but also indicating the starting address of the sequence in which that input appears. In this way, selected data entry sequences may be loaded into RAM 188, based on the goal attained or on a particular input.

The contents of the output stack 186 must include all information to be stored during step 210.

Although any suitable storage format could be used, it is presently preferred that the steps of a successful sequence be stored in sequence so that the entire sequence may be treated as a block. It may be preceded by a header, indicating the number of steps and including a directory of preceding inputs in the second field. Each data entry within the sequence may include an indication of its number in the sequence if the sequence is not stored in a contiguous block of address space.

When storage is completed, the program of FIG. 4 ends at step 212. As noted above, however, the goal may be a sequence of inputs, in which case, step 212 may include returning to step 204 to read and store the next goal.

If, on the other hand, step 208 results in a negative outcome, CPU 120 proceeds to generate the output by sequence of steps which correspond to the generating circuitry of FIG. 2. The first of these steps in the particular embodiment of FIG. 5 is to compare the input with an expected input, indicating at least one of the possible inputs in step 214. As noted above, this expected input could be stored with the output from which it results, as a part of a sequence which once led successfully to a particular goal. Therefore, the expected input may be retrieved along with the output and may be stored in an appropriate one of registers 184, pending the reading of the input in step 206 and the comparison in step 214.

If the comparison in step 214 shows that the input is one of the inputs indicated by the expected input, then CPU 120 proceeds to the next step in the sequence of steps, by loading the output register, in step 216. Then is step 218, the output is applied to the system through buffer 140 and stored in the output stack 186. This storing process cannot be completed, of course, until the resulting input is received in step 206, and may then be stored as the expected input following the output as well as the preceding input for the next outputs.

If the comparison in step 214, on the other hand, shows that the input is not expected, CPU 120 may proceed to another test to determine whether the resulting input may be treated as part of a new sequence, in step 220. This may be done by examining the preceding input directory to determine whether the input appears as a preceding input for an output step in a sequence which once led successfully to the goal sought. If so, that output step is loaded to the output register in step 222, and CPU 120 proceeds to step 218 as above.

If step 220 indicates, on the other hand, that no such new sequence is in experience, CPU 120 proceeds to generate a random number and to load the random number into the output register, in step 224. Once again, CPU 120 will then proceed to step 218. This random number capability enables self-programmer 110 to perform trial and error programming when faced with a new situation or, by a suitable modification of step 220, with a repeated failure to progress toward the goal from a specific input.

If a random number has been provided as an input, step 218 should also include storing the preceding input in output stack 186. Then, in the next occurrence of step 206, the next input should also be stored as the expected input corresponding to the random number output in output stack 186. The expected input should not, however, be compared in step 214, which should be skipped, proceeding instead to step 220.

Figure 6:
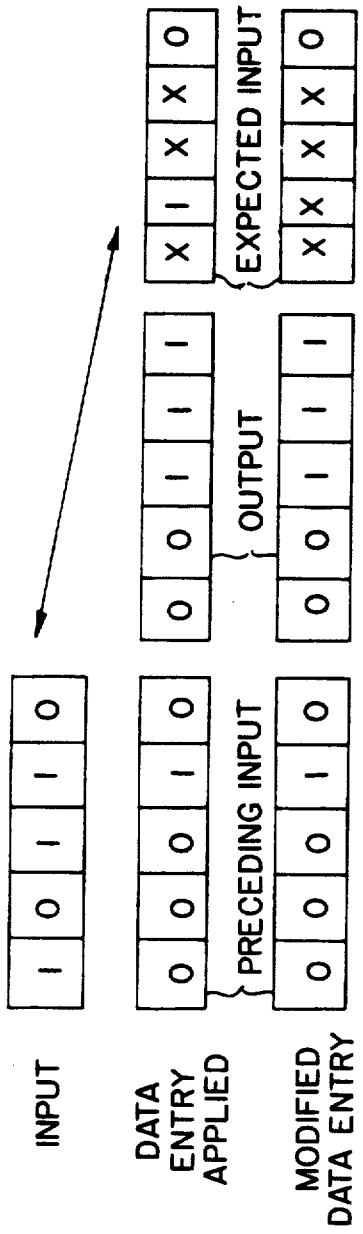
FIG. 6 is a schematic drawing of data entry modification.

Step 220, in addition to a test, may include a suitable modification of an expected input which failed to compare with the received input in step 214. FIG. 6 illustrates one technique by which this could be done. The first line of FIG. 6 shows an example of an input received by CPU 120 in response to the output shown within a data entry on the second line of FIG. 6. The data entry also includes a preceding input and an expected input. The expected input, as shown, has a series of locations, each of which may take any of three values, "0" and "1" indicating binary zero and one received and "X" indicating that either zero or one may be received. Since the input in the first line differs from the expected input at the second bit, the second bit of the expected input is modified to an "X", as shown in the third line of FIG. 6. In this manner, the expected input will gradually indicate a larger group of possible inputs which may occur in response to the output, increasing the likelihood that the comparison in step 214 will have an affirmative outcome, causing the next step of the sequence to be attempted.

Although the embodiment of FIGS. 4 and 5 is presently preferred because it may easily be implemented with current technology, we turn now to additional embodiments which promise further improvement in self-programming.

III. Modular Embodiment

Figure 7:
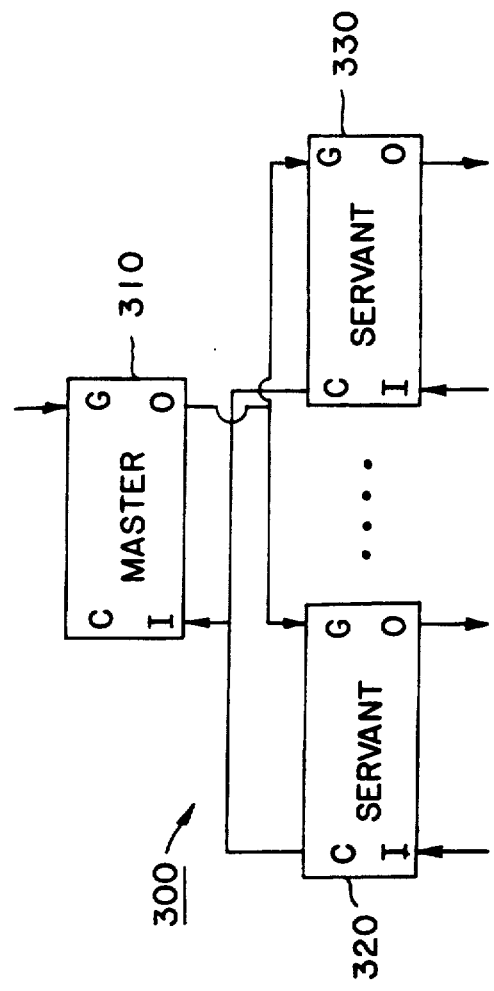
FIG. 7 is a schematic circuit diagram of a modular self-programmer according to the invention.

FIG. 7 shows a modular embodiment made possible by the present invention. Modular self-programmer 300 includes master self-programmer 310 and servant self-programmers 320 and 330. Rather than providing outputs directly to and receiving inputs directly from the system, master 310 provides outputs from terminals O to the goal inputs G of servants 320 and 330 and receives inputs at terminals I from servants 320 and 330, indicating the occurrence of a comparison signal. In other words, when a goal specified by master 310 is attained by a servant 320 or 330, that servant provides its comparison signal to master 310, as an input. In this manner, master 310 could control one or more servant self-programmers and master 310 may in turn receive its goals through a goal input G.

Each self-programmer of FIG. 7 is shown simply as a box, but the internal structure includes the functional components of FIG. 2. These components could be provided by a CPU-based embodiment like FIG. 4 or by any other appropriate embodiment of the invention.

IV. Miscellaneous

Although the embodiment of FIG. 4 has a single CPU 120 performing both the functions of generating means 50 and comparing means 60 in FIG. 2, those functions could be performed by parallel CUPs, or by parallel analog processors, if appropriate. The entire circuit of FIG. 4 could be provided as a sinle digitial VLSI circuit.

FIG. 6 illustrates how an expected state may be defined to include unspecified locations which may take either of two values. Similarly, the goal may be defined with some unspecified locations, so that any of several input will result in success. In this manner, it may be possible to accumulate experience from which fully specified goals may be more easily attained.

The steps of the flow chart in FIG. 5 are relatively simple, and each could easily be implemented with familiar programming techniques in a straightforward manner. A wide variety of algorithms could be used to increase efficiency or effectiveness, however, all within the skill of the art. The comparison algorithms, for example, could be designed to bring out the significant distinguishing features of the input data. Also, the output generating algorithms could be designed to cause the self-programmer to wait for an input after each output by providing null outputs for a given period, for example.

The present invention may have many applications. The motions of a robot may be self-programmed according to the invention. Speech recognition and synthesis could similarly be self-programmed. Numerous other possible applications could easily be identified.

Although the present invention has been disclosed in connection with a plurality of embodiments thereof, many other variations will now be apparent to those of ordinary skill in the art. Therefore, the invention is not limited by the disclosed embodiments, but only by the appended claims.

I claim:

1. A machine, comprising:
   input means for receiving input signals, each input signal being one of a plurality of possible input signals;
   signal providing means for providing a signal indicating at least one of the possible input signals;
   comparing means for comparing the input signals received by the input means with the signal indicating at least one of the possible input signals and for providing a comparison signal when one of the compared input signals is one of the input signals that is indicated by the indicating signal;
   output providing means responsive to the input signals received by the input means for providing a sequence of output signals, the sequence including a plurality of steps; and
   storing means for storing data corresponding to a plurality of the steps of the sequence of output signals in response to the comparison signal.

2. The machine of claim 1 in which the signal indicating at least one of the possible input signals includes a value, the signal providing means further being for receiving and storing the value.

3. The machine of claim 1 in which the storing means is further for storing expected input data corresponding to one of the steps of the sequence of output signals in response to the comparison signal, the expected input data indicating at least one of the possible input signals, the output providing means further being for comparing one of the input signals received by the input means with the expected input data.

4. The machine of claim 3 in which the storing means is further for storing preceding input data corresponding to each step of the sequence of output signals in response to the comparison signal, the preceding input data indicating at least one of the possible input signals, the output providing means further being for testing whether the one of the input signals received by the input means is indicated by the preceding input data.

5. The machine of claim 4 in which the output providing means further comprises random number means for generating a random number as one of the output signals when the one of the received input signals is not indicated by the preceding input data.

6. The machine of claim 3 further comprising means for modifying the expected input data when the input signal is not indicated by the expected input data.

7. The machine of claim 3 in which the output providing means further comprises random number generating menas for generating a random number as one of the output signals when the one of the input signals received is not indicated by the expected input data.

8. The machine of claim 1 in which the data corresponding to the plurality of steps of the sequence includes, for each step, data corresponding to a respective one of the output signals, the output providing means further being for providing the output signal indicated by the data corresponding to one of the steps.

9. A method comprising:
   receiving input signals, each input signal being one of a plurality of possible input signals that may be received;
   comparing each of the input signals with a signal indicating at least one of the possible input signals and providing a comparison signal upon comparing one of the input signals that is indicated by the indicating signal;
   in response to the input signals, providing a sequence of output signals, the sequence including a plurality of steps; and
   storing data corresponding to a plurality of the steps of the sequence of output signals in response to the comparison signal.

10. The method of claim 9 in which the signal indicating at least one of the possible input values includes a value, the method further comprising receiving and storing the value.

11. The method of claim 9 in which the step of providing the sequence of output signals comprises storing the output signals in a sequence in a stack, the step of storing data comprising storing in hard memory at least part of the sequence of output signals from the stack.

12. The method of claim 9 in which the step of storing data further comprises storing expected input data corresponding to one of the steps in the sequence, the expected input data indicating at least one of the possible input values, the signal providing step comprising comparing one of the input signals with the expected input data to determine whether the one of the input signals is indicated by the expected input data.

13. The method of claim 12, in which the step of storing data further comprises, for each step of the sequence of output signals, storing preceding input data, the preceding input data indicating at least one of the possible input signals, the signal providing step further comprising testing whether the one of the input signals is indicated by preceding input data of any of the steps when the expected input data does not indicate the one of the input signals.

14. The method of claim 13 in which the signal providing step further comprises generating a random number as one of the output signals when the one of the input signals is not indicated by preceding input data of any of the steps.

15. The method of claim 12 in which the signal providing step further comprises generating a random number as one of the output signals when the one of the input signals is not indicated by the expected input data.

16. The method of claim 12 further comprising modifying the expected input data when the input signal is not indicated by the expected input data.

17. The method of claim 9 in which the storing step further comprises storing, in the data corresponding to each of the steps, data indicating a respective one of the output signals, the signal providing step further comprising providing the output signal indicated by the data corresponding to one of the steps.

18. A machine comprising a master programmer and at least one servant programmer, the master programmer and each servant programmer comprising:
- input means for receiving input signals, each input signal being one of a plurality of possible input signals;
- signal providing means for providing a signal indicating at least one of the possible input signals;
- comparing means for comparing the input signals with the signal indicating at least one of the possible input signals and for providing a comparison signal when an input signal is received that is indicated by the indicating signal;
- output providing means responsive to the input signals received by the input means for providing a sequence of output signals, the sequence including a plurality of steps; and
- storing means for storing data corresponding to a plurality of the steps of the sequence of output signals in response to the comparison signal; the master programmer and each servant programmer being connected so that the signal providing means of each of the servant programmers provides its indicating signal based on one of the output signals from the output providing means of the master programmer and so that the comparison signal of each of the servant programmers is included in the input signals received by the input means of the master programmer.

19. A method comprising:
- receiving a sequence of input signals, each input signal being one of a plurality of possible input signals that may be received;
- determining whether each of the input signals is indicated by an indicating signal indicating at least one of the possible input signals;
- for a first one of the input signals that is not indicated by the indicating signal, providing an output signal, the output signal being a step in a sequence of output signals; and
- for a second one of the input signals that is indicated by the indicating signal, storing a plurality of the steps of the sequence of output signals.

20. The method of claim 19, further comprising receiving the indicating signal.

21. The method of claim 19, further comprising storing the sequence of the output signals in a stack, the step of storing a plurality of the steps comprising storing a plurality of the output signals from the stack in hard memory.

22. The method of claim 19 in which the storing step comprises storing data indicating one of the output signals in an entry with data indicating a preceding one of the input signals.

23. The method of claim 19 in which the storing step comprises storing, for each of the steps, a respective entry including data indicating a corresponding one of the output signals and expected input data indicating at least one of the possible input signals.

24. The method of claim 23, further comprising:
- comparing a third one of the input signals that is not indicated by the indicating signal with the expected input data of the respective entry of one of the steps.

25. The method of claim 24, further comprising, if the third input signal is indicated by the expected input data, proceeding to a next step in the stored plurality of steps.

26. The method of claim 24, further comprising, if the third input signal is not indicated by the expected input data, determining whether the third input signal is indicated by preceding input data in any of the entries, and, if so, providing the one of the output signals in an entry that includes preceding input data indicating the third input signal.

27. The method of claim 26, further comprising, if the third input signal is not indicated by preceding input data in any of the entries, generating a random number.

28. The method of claim 24, further comprising, if the third input signal is not indicated by the expected input data, modifying the expected input data to indicate a larger group of the possible input signals.

* * * * *